(12) United States Patent
Eye et al.

(10) Patent No.: US 7,277,544 B1
(45) Date of Patent: Oct. 2, 2007

(54) LOCAL CONTENT SECURITY SYSTEM

(75) Inventors: Randal Eye, Mechanicsville, VA (US); Thomas Siner, Chesterfield, VA (US); Jeffrey Segal, Midlothian, VA (US); David Moshe Goldschlag, Silver Spring, MD (US); Robert Wilhelm Schumann, Oakton, VA (US)

(73) Assignee: Cinea, Inc., Reston, VA (US)

( * ) Notice: Subject to any disclaimer, the term of this patent is extended or adjusted under 35 U.S.C. 154(b) by 1003 days.

(21) Appl. No.: 10/348,903

(22) Filed: Jan. 23, 2003

Related U.S. Application Data

(60) Provisional application No. 60/377,985, filed on May 7, 2002.

(51) Int. Cl.
*H04N 1/44* (2006.01)

(52) U.S. Cl. ............... 380/201; 380/278; 380/286; 705/37; 725/151; 726/26; 369/47.12; 369/84

(58) Field of Classification Search ............... 380/201, 380/279, 286, 278; 705/51, 57; 725/151; 726/26, 30; 360/60; 369/47.12, 84
See application file for complete search history.

(56) References Cited

U.S. PATENT DOCUMENTS

| | | | | |
|---|---|---|---|---|
| 5,509,071 A | * | 4/1996 | Petrie et al. | 705/53 |
| 5,646,999 A | * | 7/1997 | Saito | 705/54 |
| 5,848,158 A | * | 12/1998 | Saito et al. | 705/54 |
| 5,915,025 A | * | 6/1999 | Taguchi et al. | 380/44 |
| 5,982,892 A | * | 11/1999 | Hicks et al. | 705/51 |
| 5,991,399 A | * | 11/1999 | Graunke et al. | 380/279 |
| 6,002,772 A | * | 12/1999 | Saito | 705/58 |
| 6,714,650 B1 | * | 3/2004 | Maillard et al. | 380/231 |

* cited by examiner

*Primary Examiner*—Emmanuel L. Moise
*Assistant Examiner*—Paul Callahan
(74) *Attorney, Agent, or Firm*—David Grossman; David Yee

(57) ABSTRACT

The present invention is a system for securing broadcasting content locally at receiving stations that may be remote to a broadcaster. Embodiments of this invention implement controllable and renewable security measures, compatible with many other content processing and display systems. These security measures may include re-encrypting received broadcast content using locally generated keys, watermarking the received broadcast content, and logging both processing and display of broadcast content.

25 Claims, 11 Drawing Sheets

LOCAL CONTENT SECURITY SYSTEM

CROSS-REFERENCE TO RELATED APPLICATIONS

This present application claims the benefit of provisional patent application Ser. No. 60/377,985 to Eye et al., filed on May 7, 2002, entitled "Local Content Security System," which is hereby incorporated by reference.

BACKGROUND OF THE INVENTION

The present invention relates to field of local content protection. More specifically, the present invention is directed towards protecting broadcast content locally after the broadcast content has been received at remote locations to a broadcaster.

Secure broadcast systems encrypt data, transmit the encrypted data to a receiving location, and then allow the receiving location to decrypt the data using a decryption key. Once the broadcast content is compromised anywhere, then the broadcast content is potentially compromised everywhere. What is needed is a system that can differentiate how broadcast content is treated globally in a broadcast environment versus how the content is treated locally, and to independently and uniquely protect the broadcast content locally. Such a system would have the advantage of minimizing the cost of a locally breached security system.

Because content may be most vulnerable at remote locations to the broadcaster, once the local security of a system has been breached at the local location, future content at that local location may also be breached. Therefore, there is also needed is a system in which security at a local location may be refreshed either periodically, or after a security breach is suspected.

Different broadcasters may process their data differently for use on specific playback platforms. Further, encryption may need to be tailored to particular local environments. This may cause compatibility problems when trying to provide a generic local security solution for broadcasted content. There is a need for a local broadcast content security system to work independently of a broadcasters data processing.

Broadcasters may also desire to control how and when broadcast content is processed and displayed at different receiving stations. Needed is a local broadcast content security system which allows control over how different receiving stations process and display data.

Broadcasters may be interested in auditing how their broadcast content is processed and displayed locally. Therefore, there may be a need to generate and maintain logs of how broadcast content is processed and displayed locally.

When broadcast content is pirated because a security breach has occurred, it may be important for the broadcaster to determine where the security breach has occurred. Therefore, a local broadcast content security system may need to watermark content locally before it is presented.

Moving keys around always increases the chance of broadcast content being compromised. Therefore, there is a need for a local content security system to generate and store keys used for locally re-encrypting content.

What is needed is a system for securing broadcasting content locally at receiving stations that may be remote to a broadcaster. This system may need to implement controllable and renewable security measures, compatible with many other content processing and display systems. Security measures may include re-encrypting received broadcast content using locally generated keys, watermarking the received broadcast content, and logging both processing and display of broadcast content.

BRIEF SUMMARY OF THE INVENTION

One advantage of the present invention is that it provides for uniquely securing broadcast content locally, at receiving stations, that may be remote to the broadcaster.

Another advantage of this invention is that it may provide for controllable and renewable security measures.

Another advantage of this invention is that it may be compatible with many other content processing and display systems.

A further advantage of this invention is that it may re-encrypt received broadcast content using locally generated keys.

A further advantage of this invention is that it may watermark received broadcast content.

Yet a further advantage of this invention is that it may log both processing and display of broadcast content.

Yet a further advantage of this invention is that it provides for using a first protection mechanism to protect content while it is being broadcast and then to use a second protection mechanism to protect the content locally.

To achieve the foregoing and other advantages, in accordance with all of the invention as embodied and broadly described herein, a local content security system comprising: a broadcast medium reader, capable of reading a broadcast medium containing encrypted broadcast content encrypted using a broadcast encryption key; a local key generator capable of generating at least one local key set, the local key set containing: a local encryption key; and a local decryption key; a local content security processor including: a broadcast receiver capable of receiving the encrypted broadcast content; an encrypted content decryptor, capable of generating decrypted content by decrypting the encrypted broadcast content using a broadcast decryption key, the broadcast decryption key capable of decrypting the encrypted broadcast content; a local re-encrypter capable of generating re-encrypted content by re-encrypting the decrypted content using at least one of the local encryption keys; a local decryption key dispatcher; and a local re-encrypted content dispatcher; and a trusted destination including: a local re-encrypted content receiver for receiving the local re-encrypted content from the local re-encrypted content dispatcher; a local decryption key receiver for receiving the local decryption key from the local decryption key dispatcher; and a local re-encrypted content decrypter, wherein the local re-encrypted content decrypter constructs processed content by decrypting the local re-encrypted content using the local decryption key.

In a further aspect of the invention, a method for providing local content security including the steps of: receiving encrypted broadcast content from a broadcast medium, the encrypted broadcast content encrypted using a broadcast encryption key; generating decrypted content by decrypting the broadcast content, using a broadcast decryption key; generating at least one local key set, the local key set including: a local encryption key; and a local decryption key; associating at least one of the local key sets with the re-encrypted content; generating re-encrypted content by re-encrypting the decrypted content using at least one of the local encryption keys; dispatching the local decryption key to a trusted device; dispatching the local re-encrypted content to the trusted device; and generating processed content in the trusted device by decrypting the local re-encrypted content using the local decryption key.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention is a system for securing broadcast content locally at receiving stations that may be remote to a broadcaster. Embodiments of this invention implement controllable and renewable security measures, compatible with many other content processing and display systems. These security measures may include re-encrypting received broadcast content using locally generated keys, watermarking the received broadcast content, and logging both processing and display of broadcast content.

Figure 1:
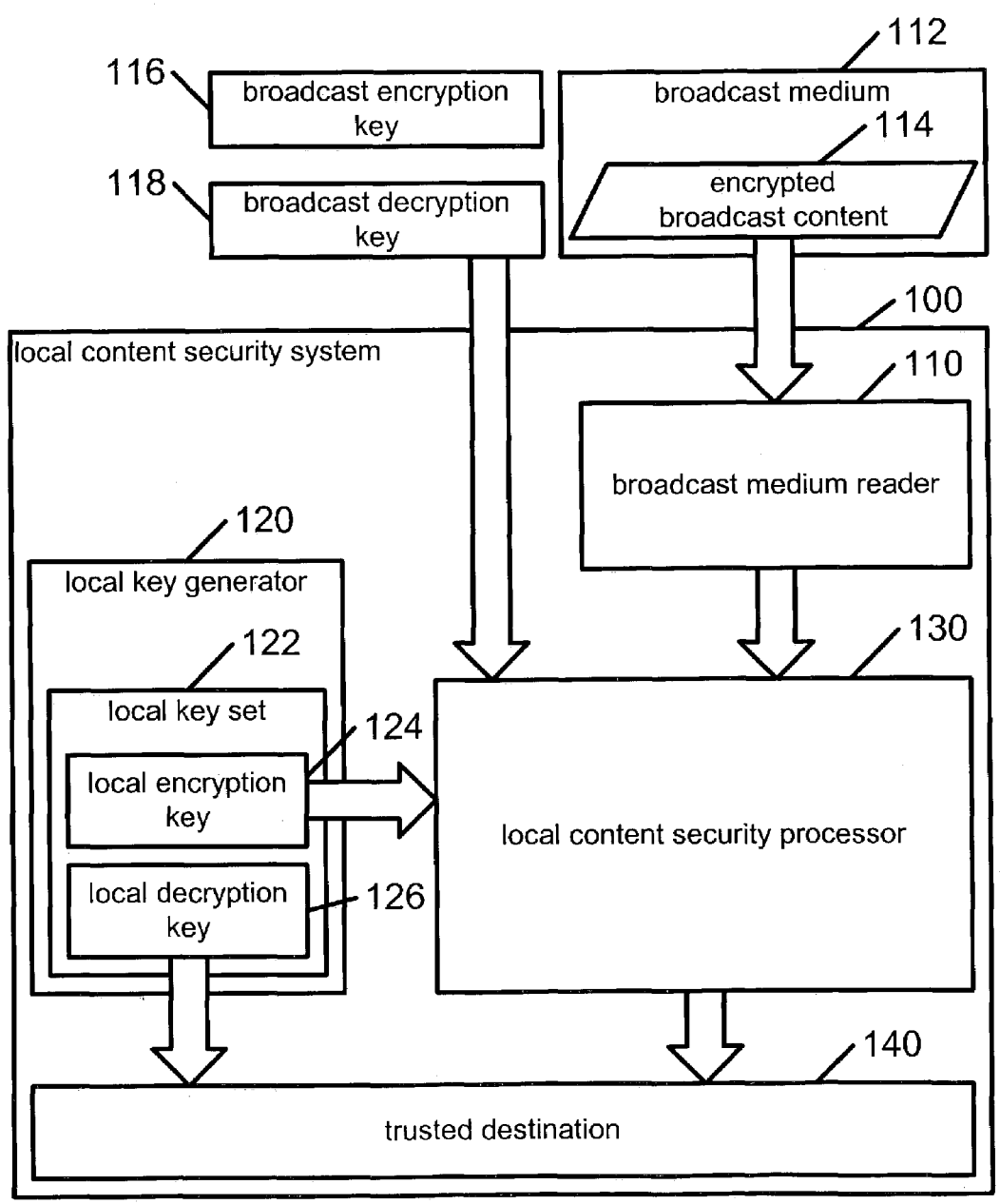
FIG. 1 is a block diagram of a local content security system as per an embodiment of the present invention.

FIG. 1 is a block diagram of a local content security system 100 as per an embodiment of the present invention. The local content security system 100 may comprise: a broadcast medium reader 110; a local key generator 120; a local content security processor 130; and a trusted destination 140.

The broadcast medium reader 110 is preferably capable of reading a broadcast medium 112 containing encrypted broadcast content 114 encrypted using a broadcast encryption key 116. The broadcast medium 112 may be any type of medium capable of transporting or storing encrypted broadcast content 114. Examples of broadcast medium 112 include magnetic discs, optical discs, solid state memory, radio frequency transmissions, satellite transmissions, electrical wire, and optical fibers. Similarly, examples of broadcast medium readers 110 may include magnetic disc readers, optical disc readers, solid state memory readers, radio frequency receivers, electrical receivers, and optical detectors. The encrypted broadcast content 114 may be broadcast content encrypted using any encryption method including but not limited to DES, Triple-DES, or AES. Broadcast content may include any type of content. Examples include but are not limited to digital cinema content, video content, multimedia content, or informational content.

The local key generator 120 is preferably capable of generating at least one local key set 122. The local key set 122 may be used to encrypt and decrypt content and may include a local encryption key 124 and a local decryption key 126. Further, the local key set could actually be a symmetric key 722. In some instances, the symmetric key 722 will be capable of being used for both encryption and decryption.

Figure 2:
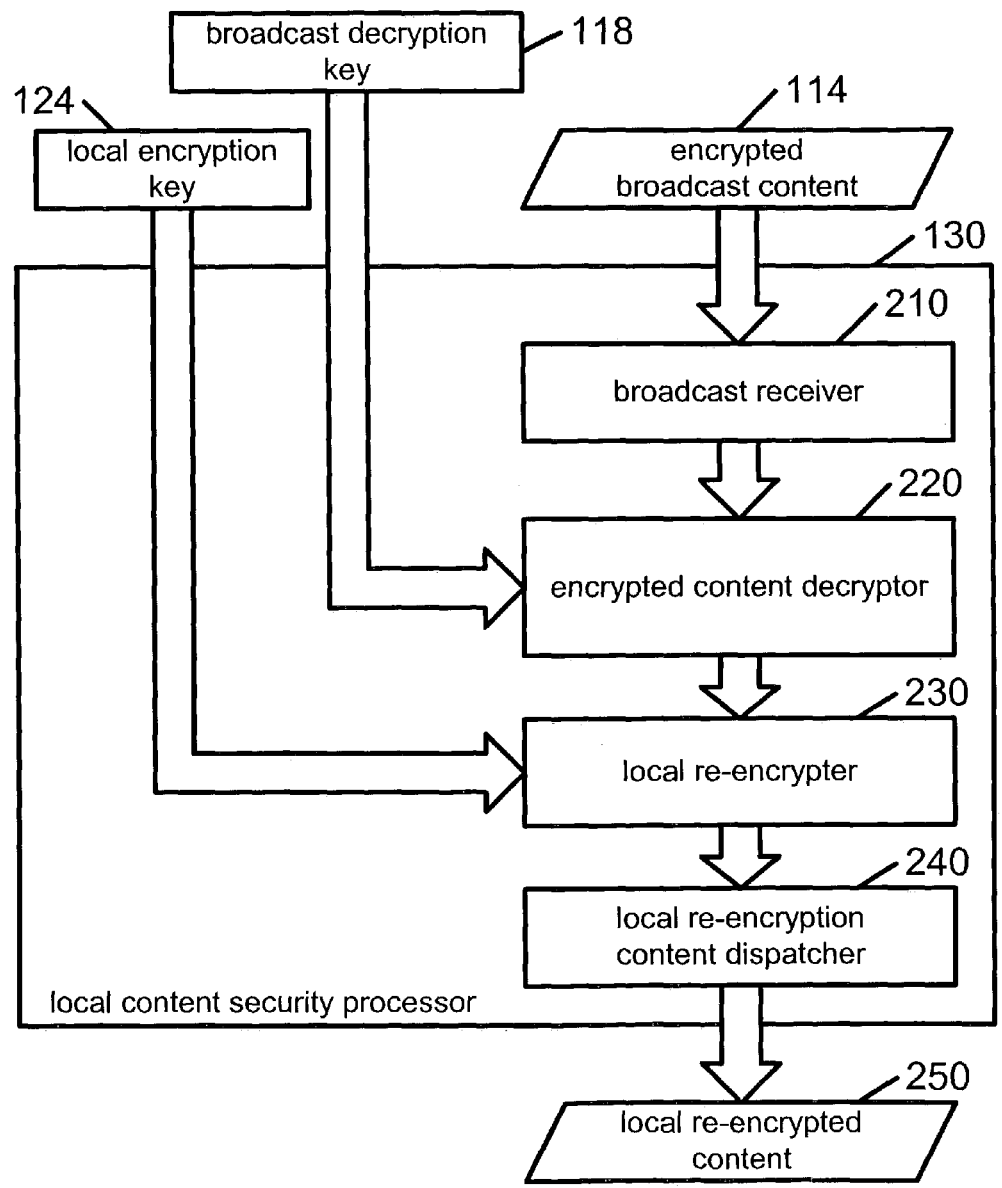
FIG. 2 is a block diagram of a local content security processor as per an aspect of an embodiment of the present invention.

FIG. 2 is a block diagram of a local content security processor 130 as per an aspect of an embodiment of the present invention. The local content security processor 130 locally processes the encrypted broadcast content 114 and may include a broadcast receiver 210, an encrypted content decryptor 220, a local re-encrypter 230, and a local re-encrypted content 250 dispatcher. The broadcast receiver 210 is preferably capable of receiving the encrypted broadcast content 114 into the local content security processor 130 from the broadcast medium reader 110. The encrypted content decryptor 220 is preferably capable of generating decrypted content by decrypting the received encrypted broadcast content 114 using a broadcast decryption key 118 capable of decrypting the encrypted broadcast content 114. Next, the local re-encrypter 230 preferably generates local re-encrypted content 250 by re-encrypting the decrypted content using one of the local encryption keys 124. Local re-encrypted content 250 may then be sent for further application by the local re-encrypted content dispatcher 240.

Figure 3:
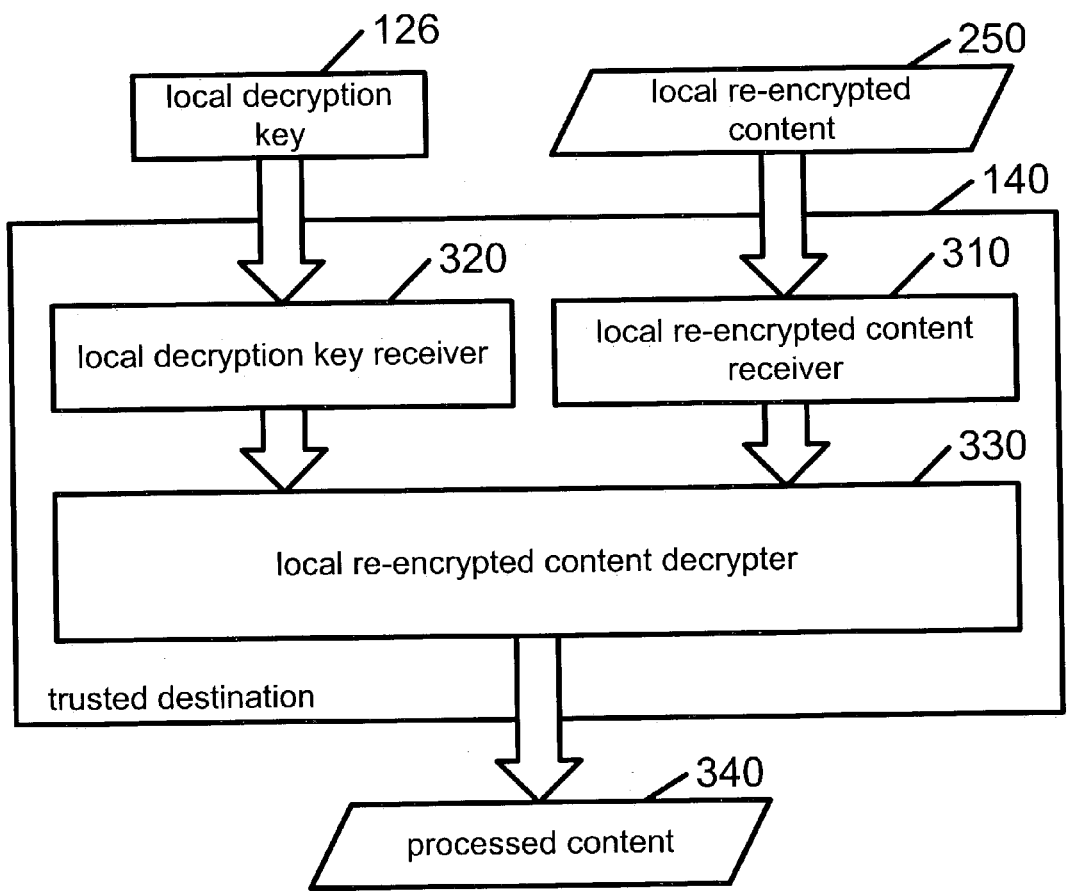
FIG. 3 is a block diagram of a trusted destination as per an aspect of an embodiment of the present invention.

FIG. 3 is a block diagram of a trusted destination 140 as per an aspect of an embodiment of the present invention. The trusted destination 140 is unit that may be remote to the local content security processor 130 that is preferably capable of using the locally re-encrypted content 250. The trusted destination 140 may also be a trusted device or include a trusted device. A trusted device is a device that is also preferably capable of using the locally re-encrypted content 250. Components of the trusted destination 140 may include a local re-encrypted content receiver 310, a local decryption key receiver 320, and a local re-encrypted content decrypter 330. The local re-encrypted content receiver 310 preferably receives the local re-encrypted content 250 from the local re-encrypted content dispatcher 240. The local decryption key receiver 320 may receive the local decryption key 126 from the local key generator 120. The local re-encrypted content decrypter 330 preferably constructs processed content 340 by decrypting the local re-encrypted content 250 using the local decryption key 126.

Figure 4:
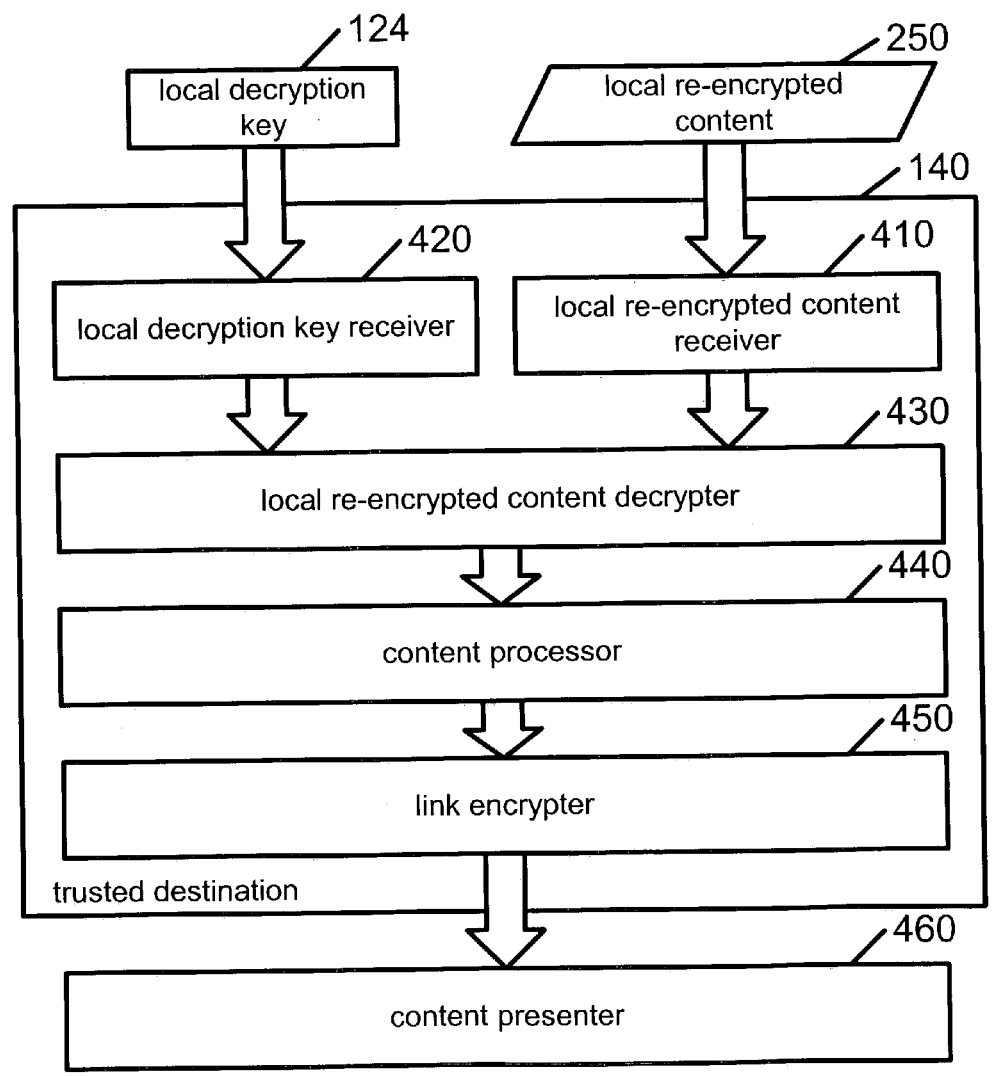
FIG. 4 is a block diagram of a trusted destination as per an aspect of an embodiment of the present invention.

FIG. 4 is a block diagram of a trusted destination 140 as per an aspect of an embodiment of the present invention. Shown in this exemplary embodiment of a trusted destination 140 is a content processor 440. A content processor 440 may be any device which can further process the broadcast content. Examples of content processors 440 include but are not limited to decoders, interpreters, and additional decryptors. Decoders may decompress content compressesed using any type of compression method or device such as wavelet, or MPEG compression.

Also shown in this embodiment is a link encrypter 450. Link encrypter 450 may reencrypt the processed content for transmission to a content presenter 460. Performing link encryption may provide for an additional level of security so that the broadcast content doesn't have to be in the clear when being transmitted to the content presenter 460. The content presenter 460 may be any content playback device such as a digital projector, a computer, or a television.

Figure 5:
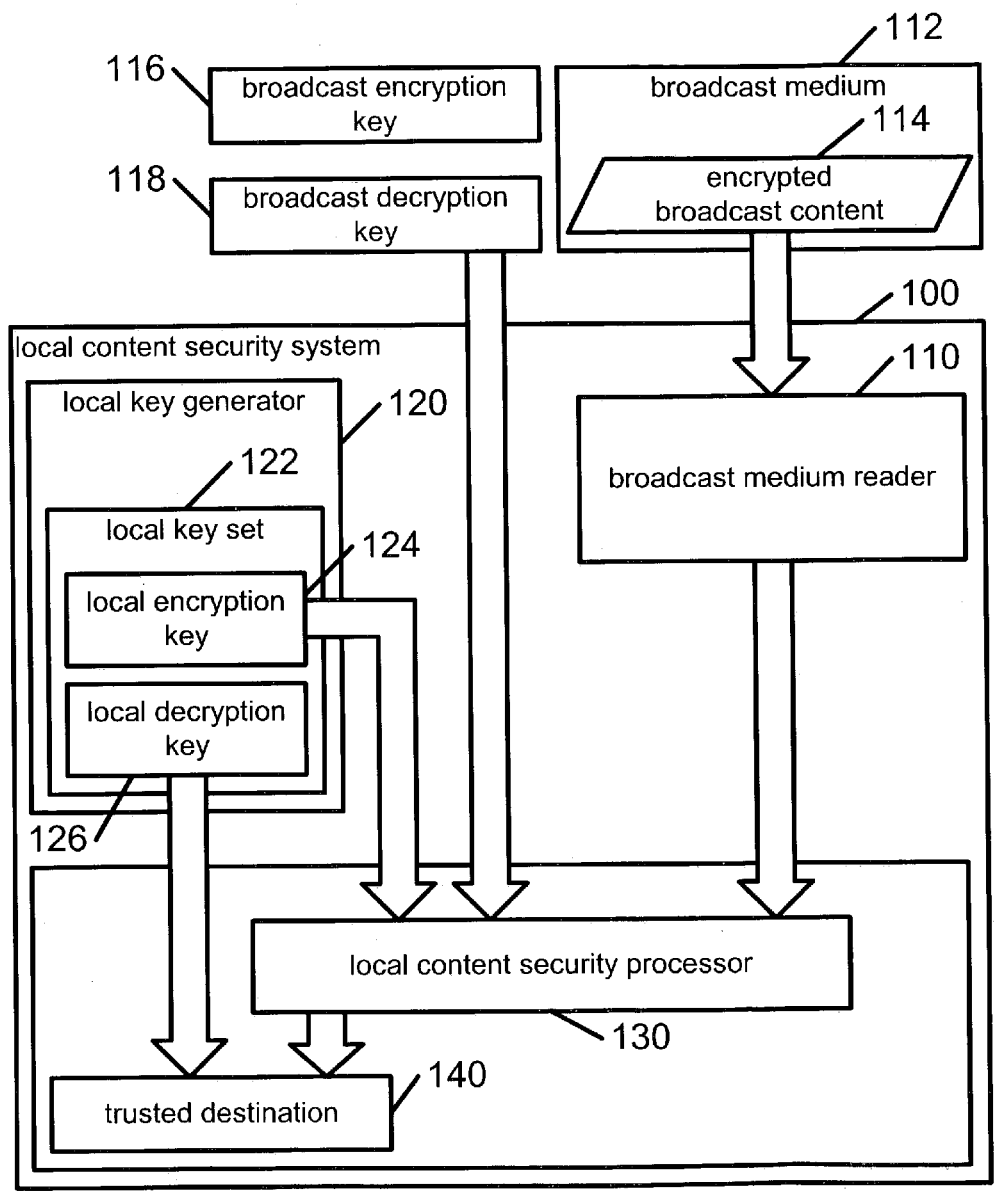
FIG. 5 is a block diagram of a local content security system with a local content security processor co-located with a trusted destination as per an aspect of an embodiment of the present invention.
Figure 6:
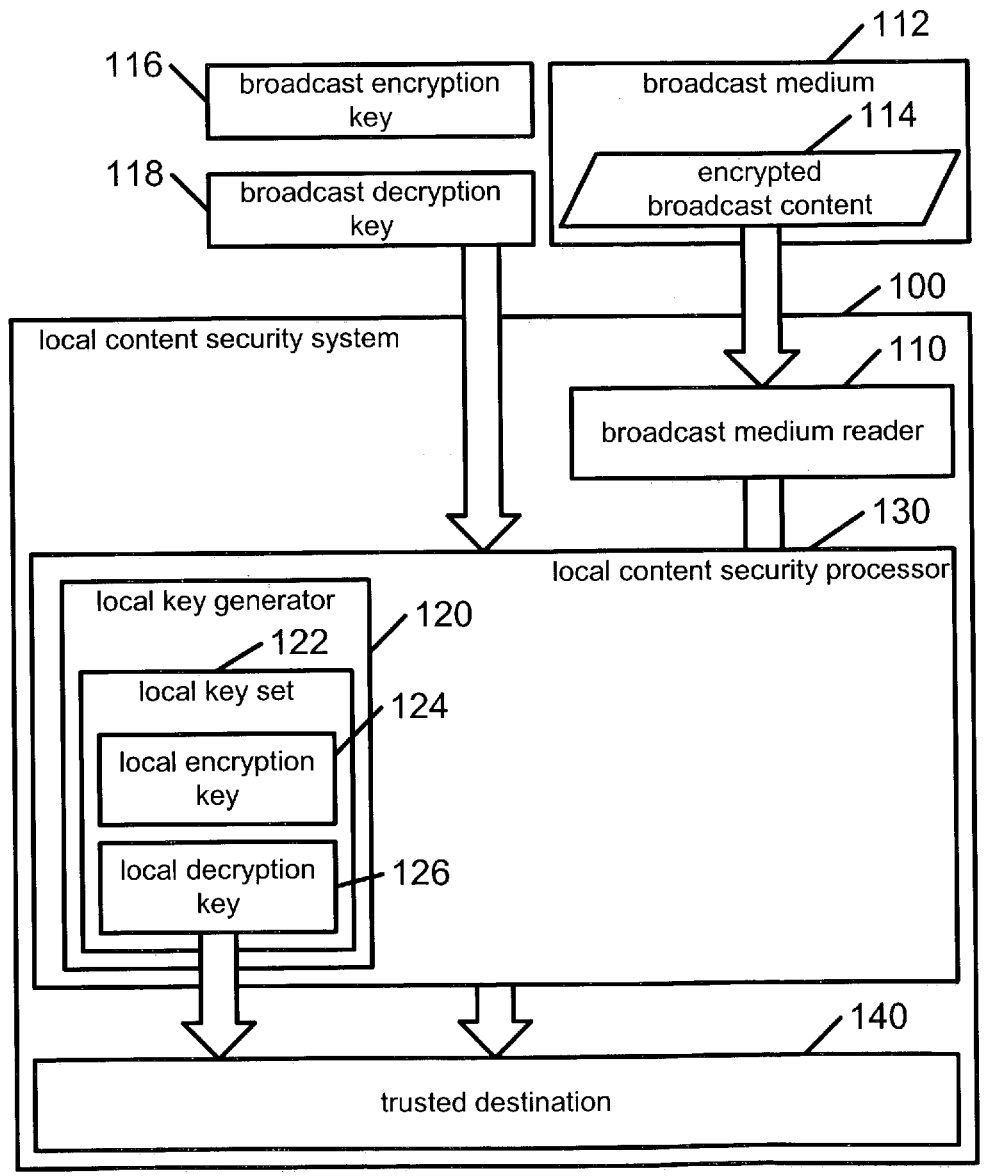
FIG. 6 is a block diagram of a local content security system showing an integrated local key generator and local content security processor as per an aspect of an embodiment of the present invention.

FIG. 5 is a block diagram of a local content security system 100 with a local content security processor 130 co-located with a trusted destination 140 as per an aspect of an embodiment of the present invention. This arrangement may be useful economically and in eliminating one or more exposed links in the local content security system 100. Similarly, the local key generator 120 and local content security processor 130 may also be integrated into a singular unit as shown in FIG. 6.

Figure 7:
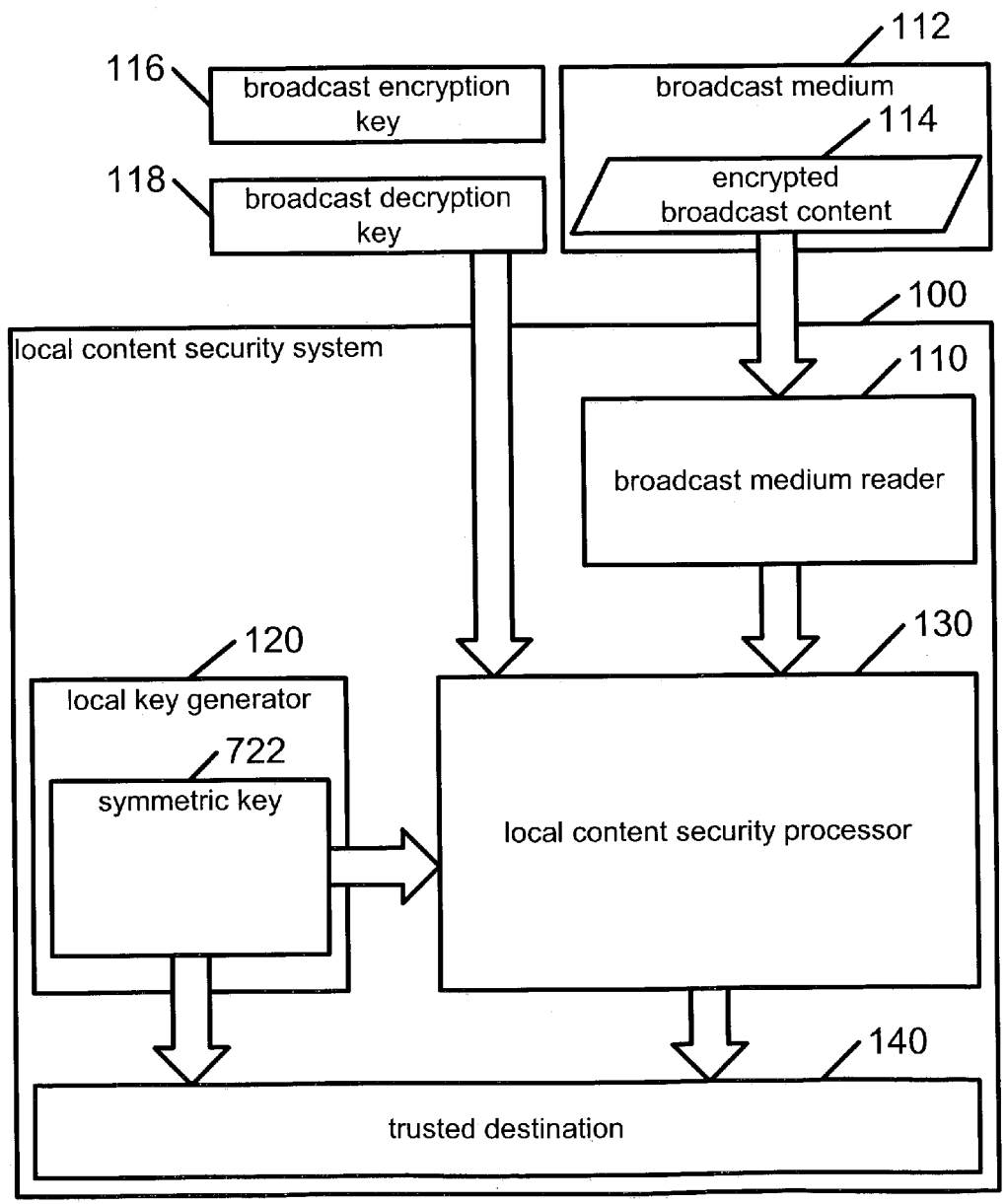
FIG. 7 is a block diagram of a local content security system showing a integrated local key generator which produces a symmetric key as per an aspect of an embodiment of the present invention.

FIG. 7 is a block diagram of a local content security system 100 showing a integrated local key generator 120 which produces a symmetric key 722 as per an aspect of an embodiment of the present invention. The present invention may be practiced using a single symmetric key 722 that may be used for both encryption and decryption. This single key may be easier to transferred to trusted device by either the local content security processor 130 or the local key generator 120.

Figure 8:
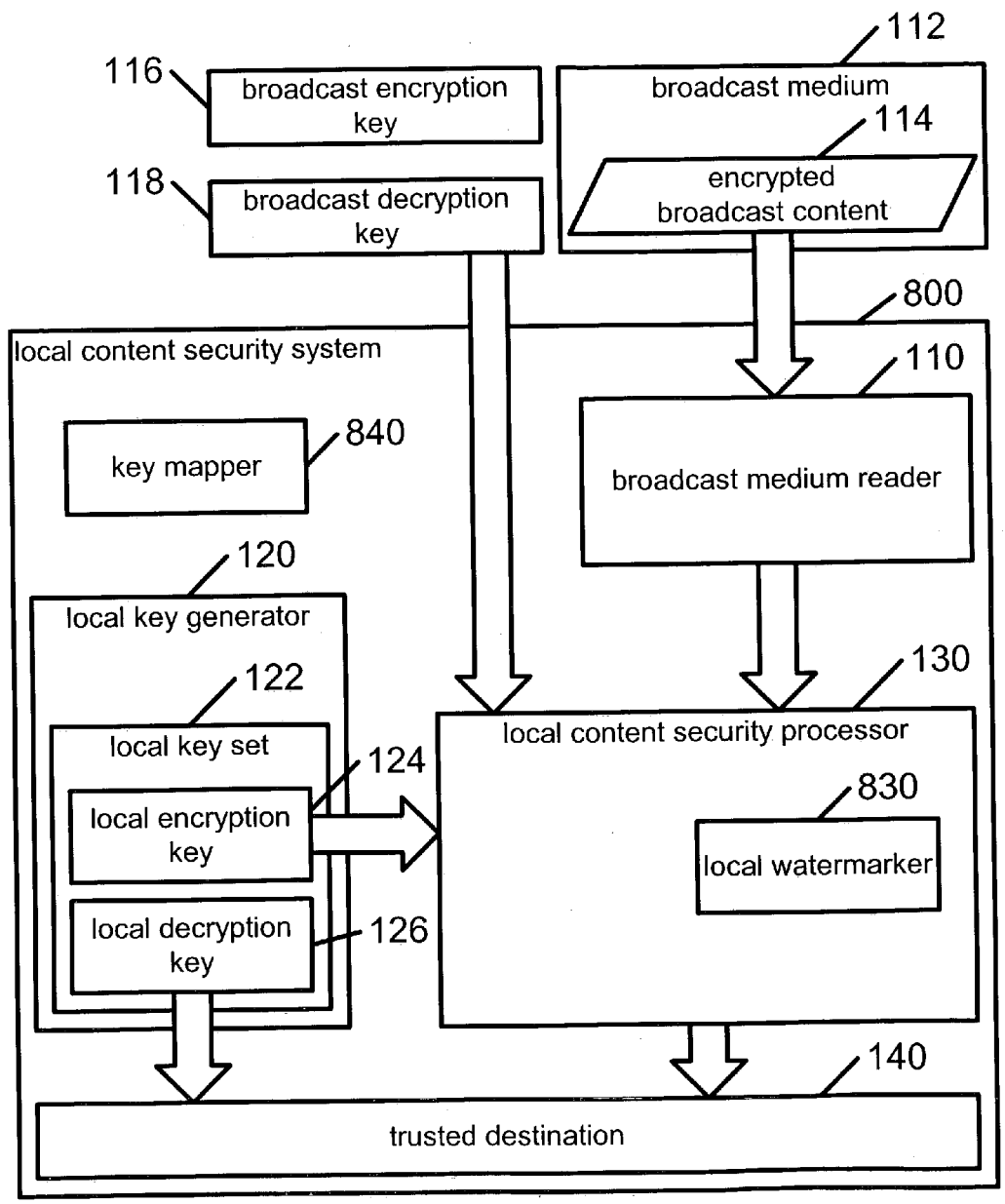
FIG. 8 is a block diagram of a local content security system showing a key mapper and a local watermarker as per an aspect of an embodiment of the present invention.

FIG. 8 is a block diagram of a local content security system 100 showing a key mapper 840 and a local watermarker 830 as per an aspect of an embodiment of the present invention. The key mapper 840 preferably associates at least one of the local key sets 122 with the re-encrypted content. In some cases, the local keys will change with the broadcast content or within the broadcast content. In these cases, a key mapper 840 may provide a mechanism for tracking the keys with content.

The local watermarker 830 preferably applies a local watermark to the broadcast content. This local watermark may include information such as the local player, when the content was broadcast, when the content encrypted, and when the content was decrypted. The watermarker may be located in the content stream to selectively apply the watermark to the content at various points. For example the watermarker could be located so that it may apply a watermark to the encrypted broadcast content 114. Likewise, the watermarker could be located so that it may apply a watermark to the decrypted content, the re-encrypted content, or to the processed content 340.

Figure 9:
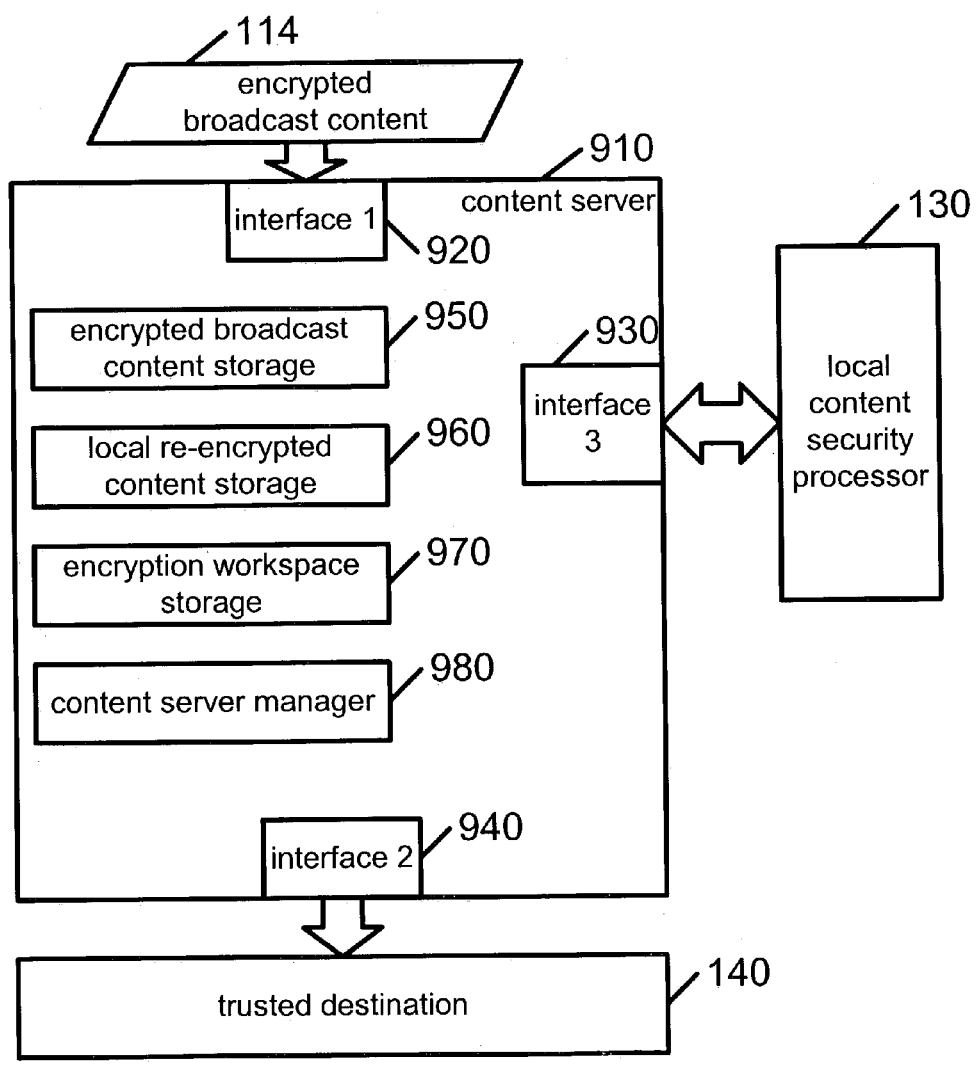
FIG. 9 is a block diagram of a content server as per an aspect of an embodiment of the present invention.

FIG. 9 is a block diagram of a content server 910 that may be used as part of a local content security system 100 as per an aspect of an embodiment of the present invention. This content server 910 may be any type of content server including a video server. This server may include interfaces which may be used to interact with other components of the local content security system 100. As shown in figure nine, there is a first interface 920 for receiving the encrypted broadcast content 114, a second interface 940 for interfacing with a local content security processor 130, and a third interface 930 for interfacing with a trusted destination 140.

The content server 910 may also include storage capabilities to store data. For instance, the example in FIG. 9 shows an encrypted broadcast content storage 950, local re-encrypted content storage 960, and encryption workspace storage 970. It is envisioned that storage may be provided for all aspects of the content servers 910 function. Further, the content server 910 may include a content server manager 980 which may control many of the content server 910 functions.

Figure 10:
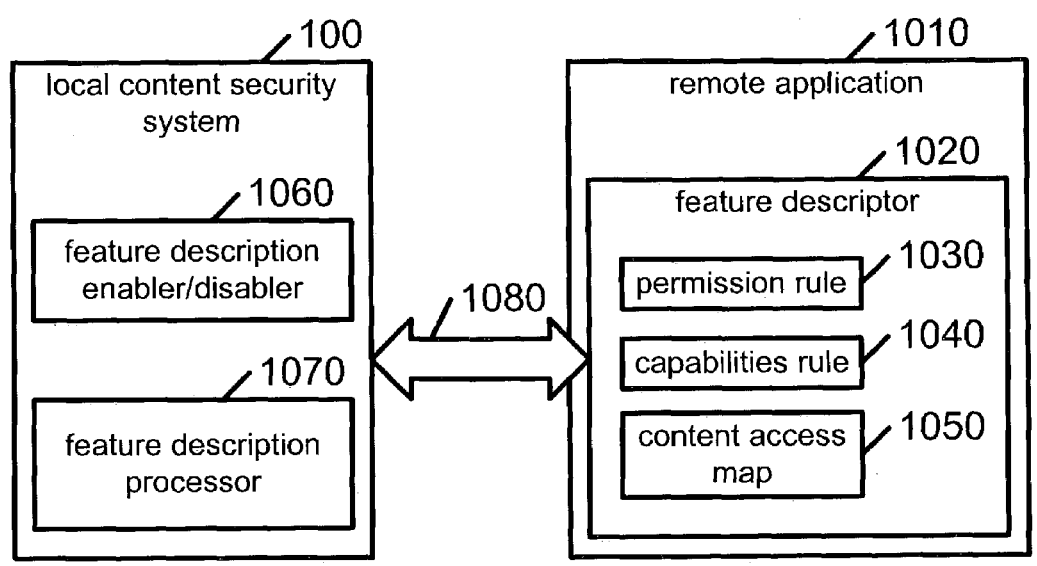
FIG. 10 is a block diagram of a local content security system and a remote location as per an aspect of an embodiment of the present invention.

FIG. 10 is a block diagram of a local content security system 100 and a remote location 1010 as per an aspect of an embodiment of the present invention. To communicate with the remote location 1010, local content security system 100 may include a back channel 1080. The back channel 1080 may be any type of communications channel capable of allowing the local content security system 100 to communicate with the remote application 1010. For example, a back channel 1080 may be implemented with a telephone line, the internet, or a satellite. The back channel 1080 may be dedicated or shared.

The local content security system 100 may only allow communications over a back channel 1080 with approved remote locations. The approval could be predetermined or dynamically determined. One result of this scheme could be to increase system security. One use of the back channel 1080 may be to refresh the local content security system 100. Refreshing the local content security system 100 may be performed by downloading to the local content security system 100 new security parameters and information. The security parameters and information may include new broadcast decryption key 118, and instructions on what content may or may not be processed locally. These refresh communications may be made at anytime for any reason such as periodically as a routine refresh or on demand whenever a security breach is suspected.

At least one feature descriptor 1020 may be provided to the local content security system 100 by the remote application 1010. Each feature descriptor may include at least one permission rule 1030, at least one capabilities rule 1040, a content access map 1050. A permission rule 1030 may detail what system features may or may not be used in the system. A capabilities rule 1040 may detail what capabilities the system may have or use. A content access map may map rules such as permission rules 1030 and capabilities rules 1040 to broadcast content.

The local content security system 100 may further include feature descriptor storage to store all or part of the content feature descriptors 1020. This storage may be solid state, mechanical, or other type of storage. The information stored may directly obtained from content feature descriptors 1020 or determined by interpreting the meaning of the content feature descriptors 1020 with respect to a specific local content security system 100 or specific broadcast content.

In some embodiments of the present invention, there may be a plurality of encrypted broadcast content 114. Each of the plurality of encrypted broadcast content 114 may be given or already have an identifier. One or more feature descriptors 1020 may be associated by the identifier to at least one of the plurality of encrypted broadcast content 114. A feature description enable/disabler 1060 may then enable or disable system features according to the feature descriptor 1020 and identifier.

To increase security of the broadcasted content, it may be preferable that in some cases, that only the encrypted broadcast content 114 and the processed content 340 is available outside of the local content security system 100. Reducing the number of exposed lines may also increase security. For example, the local content security processor 130 may be integrated with the broadcast receiver 210, thus containing the connection between these components within their common container.

The trusted destination 140 may also contain a broadcast content decoder. This decoder could decode the processed content. For example the processed content could be compressed using a compression algorithm such as MPEG or some variant. In this case, it may be desirable for the local content security system 100 the content decoder to be an MPEG decoder.

Figure 11:
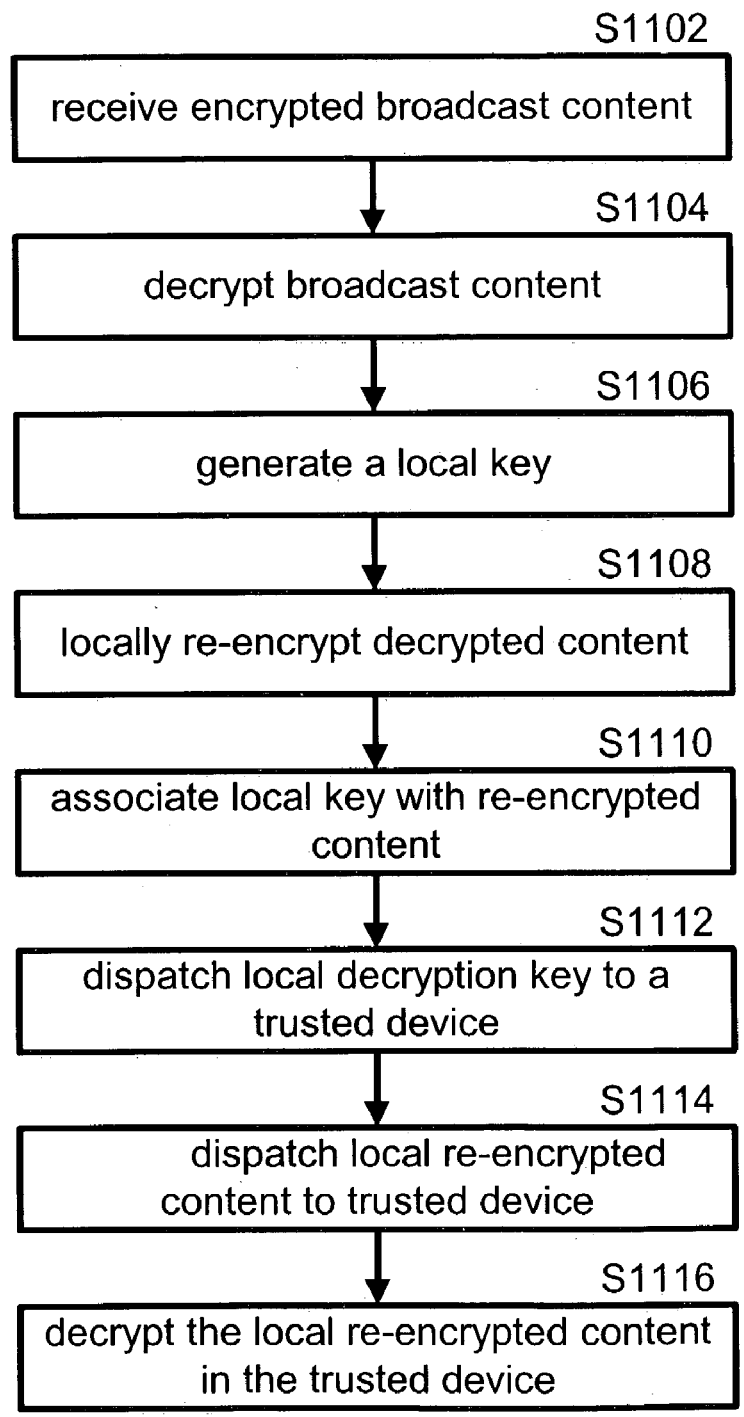
FIG. 11 is a flow diagram of a local content security system as per an aspect of an embodiment of the present invention.

FIG. 11 is a flow diagram of a local content security system 100 as per an aspect of an embodiment of the present invention. This disclosed method for providing local content security includes a series of steps that may be used in or out of sequence. The series of steps are being described in a particular order for exemplary purposes only. On skilled in the art will recognize that variations may be practiced to achieve the overall result of the invention. First, at step S1102, encrypted broadcast content 114 may be received from a broadcast medium 112. Many different types of content such as digital cinema content, video content, multimedia content, or informational content may be encrypted as encrypted broadcast content 114. The encrypted broadcast content 114 encrypted may have been encrypted using a broadcast encryption key 116. Next at step S1104, decrypted content may be generated by decrypting the broadcast content. This decryption is preferably performed using a broadcast decryption key 118. At least one local key set 122 may be generated at step S1106. Generated local key sets 122 may include a local encryption key 124 or a local decryption key 126. In some cases the local key set 122 may be a symmetric key 722.

At step S1108, re-encrypted content may be generated by re-encrypting the decrypted content using at least one of the local encryption keys 124. Preferably, at least one of the local key sets 122 will be associated with the re-encrypted content at step S1110. The local decryption key 126 may be dispatched to a trusted device at step S1112. Similarly, the local re-encrypted content 250 is preferably dispatched to the trusted device as shown at step S1114. At step S1116 processed content 340 may be generated in the trusted device by decrypting the local re-encrypted content 250 using the local decryption key 126.

An additional step of applying a local watermark to the broadcast content at various steps of processing may be desirable. For example, a watermark may be applied to decrypted broadcast content, to re-encrypted content, or to processed content 340.

Steps may also be practiced which include storing and retrieving encrypted broadcast content 114, storing and retrieving the local re-encrypted content 250, or storing and retrieving the partially re-encrypted content. In fact, steps to store and retrieve any data relevant to implementing the present invention may be used.

The processed content 340 may undergo a step of being link encrypted. This step will encrypt the processed content 340 before it is sent to a content presenter, thus protecting the content as it is sent over a potentially exposed link in the system.

It may also be preferable to further process the processed content 340. This processing could include decompression, data insertion, or data removal. When the processed data is compressed, an added step may include decoding the processed content 340. This step may decode any type of encoded content such as wavelet or MPEG encoded processed content. For example, it the processed content is encoded using MPEG or some variant, then this step may decoding the processed content 340 using an MPEG decoder.

The present system may also include the step of presenting the processed content 340. This step of presenting the processed content 340 may use any type of content presentation device such as a digital projector, or a computer.

The presented method may further include a step of communicating with a remote application through a back channel 1080. This communication may include receiving at least one feature descriptor 1020. Each feature descriptor 1020 may be associated with encrypted broadcast content 114 using an identifier. The feature descriptor(s) 1020 may include: one or more permission rules 1030; one or more capabilities rules 1040; or one or more content access maps 1050. Various capabilities and features in the system may be enabled or disabled according to any feature descriptor 1020.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used to increase security of any type of data that needs distribution, not just digital entertainment content.

What is claimed is:

1. A local content security system comprising:
   (a) a broadcast medium reader, capable of reading a broadcast medium containing encrypted broadcast content encrypted using a broadcast encryption key;
   (b) a local key generator capable of generating at least one local key set, said local key set containing:
      (i) a local encryption key; and
      (ii) a local decryption key;
   (c) a local content security processor including:
      (i) a broadcast receiver capable of receiving said encrypted broadcast content;
      (ii) an encrypted content decryptor, capable of generating decrypted content by decrypting said encrypted broadcast content using a broadcast decryption key, said broadcast decryption key capable of decrypting said encrypted broadcast content;
      (iii) a local re-encrypter capable of generating local re-encrypted content by re-encrypting said decrypted content using at least one of said local encryption keys; and
      (iv) a local re-encrypted content dispatcher;
   (d) a trusted destination including:
      (i) a local re-encrypted content receiver for receiving said local re-encrypted content from said local re-encrypted content dispatcher;
      (ii) a local decryption key receiver for receiving said local decryption key from said local decryption key dispatcher; and (iii) a local re-encrypted content decrypter, wherein said local re-encrypted content decrypter constructs processed content by decrypting said local re-encrypted content using said local decryption key; and (e) a local watermarker, capable of applying a local watermark to said decrypted broadcast content.

2. A local content security system according to claim 1, wherein said local watermark applies said local watermark to said decrypted content.

3. A local content security system according to claim 1, wherein said local watermark applies said local watermark to said re-encrypted content.

4. A local content security system according to claim 1, wherein said local watermarker applies said local watermark to said processed content.

5. A local content security system comprising:
(a) a broadcast medium reader, capable of reading a broadcast medium containing encrypted broadcast content encrypted using a broadcast encryption key;
(b) a local key generator capable of generating at least one local key set, said local key set containing:
  (i) a local encryption key; and
  (ii) a local decryption key;
(c) a local content security processor including:
  (i) a broadcast receiver capable of receiving said encrypted broadcast content;
  (ii) an encrypted content decryptor, capable of generating decrypted content by decrypting said encrypted broadcast content using a broadcast decryption key, said broadcast decryption key capable of decrypting said encrypted broadcast content;
  (iii) a local re-encrypter capable of generating local re-encrypted content by re-encrypting said decrypted content using at least one of said local encryption keys; and
  (iv) a local re-encrypted content dispatcher;
(d) a trusted destination including:
  (i) a local re-encrypted content receiver for receiving said local re-encrypted content from said local re-encrypted content dispatcher;
  (ii) a local decryption key receiver for receiving said local decryption key from said local decryption key dispatcher; and
  (iii) a local re-encrypted content decrypter, wherein said local re-encrypted content decrypter constructs processed content by decrypting said local re-encrypted content using said local decryption key; and
(e) a local watermarker, capable of applying a local watermark to said encrypted broadcast content.

6. A local content security system comprising:
(a) a broadcast medium reader, capable of reading a broadcast medium containing encrypted broadcast content encrypted using a broadcast encryption key;
(b) a local key generator capable of generating at least one local key set, said local key set containing:
  (i) a local encryption key; and
  (ii) a local decryption key;
(c) a local content security processor including:
  (i) a broadcast receiver capable of receiving said encrypted broadcast content;
  (ii) an encrypted content decryptor, capable of generating decrypted content by decrypting said encrypted broadcast content using a broadcast decryption key, said broadcast decryption key capable of decrypting said encrypted broadcast content;
  (iii) a local re-encrypter capable of generating local re-encrypted content by re-encrypting said decrypted content using at least one of said local encryption keys; and
  (iv) a local re-encrypted content dispatcher; and
(d) a trusted destination including:
  (i) a local re-encrypted content receiver for receiving said local re-encrypted content from said local re-encrypted content dispatcher;
  (ii) a local decryption key receiver for receiving said local decryption key from said local decryption key dispatcher; and
  (iii) a local re-encrypted content decrypter, wherein said local re-encrypted content decrypter constructs processed content by decrypting said local re-encrypted content using said local decryption key; and
wherein said local content security system further includes a back channel, said back channel capable of communicating with a remote application.

7. A local content security system according to claim 6, wherein said back channel only communicates with an approved remote application.

8. A local content security system according to claim 6, wherein said remote application provides at least one feature descriptor.

9. A local content security system according to claim 8, wherein each of said at least one feature descriptor includes at least one permission rule.

10. A local content security system according to claim 8, wherein each of said at least one feature descriptor includes at least one capabilities rule.

11. A local content security system according to claim 8, wherein each of said at least one feature descriptor includes at least one content access map.

12. A local content security system according to claim 6, wherein said local content security system further includes a feature descriptor storage.

13. A local content security system according to claim 8, wherein:
(a) said encrypted broadcast content is a plurality of encrypted broadcast content;
(b) at least one of said plurality of encrypted broadcast content has an identifier; and
(c) at least one feature descriptor is associated by said identifier to at least one of said plurality of encrypted broadcast content.

14. A local content security system according to claim 6, wherein said local content security system enables and disables system features according to said feature descriptor.

15. A method for providing local content security including the steps of:
(a) receiving encrypted broadcast content from a broadcast medium, said encrypted broadcast content encrypted using a broadcast encryption key;
(b) generating decrypted content by decrypting said encrypted broadcast content, using a broadcast decryption key;
(c) generating at least one local key, said local key including:
  (i) a local encryption key;
  (ii) a local decryption key;
(d) generating re-encrypted content by re-encrypting said decrypted content using at least one of said local encryption keys;
(e) associating at least one of said local key sets with said re-encrypted content;

(f) dispatching said local decryption key to a trusted device;

(g) dispatching said local re-encrypted content to said trusted device; and (h) generating processed content in said trusted device by decrypting said local re-encrypted content using said local decryption key; and (i) applying a local watermark to said decrypted broadcast content.

16. A method for providing local content security including the steps of:
    (a) receiving encrypted broadcast content from a broadcast medium, said encrypted broadcast content encrypted using a broadcast encryption key;
    (b) generating decrypted content by decrypting said encrypted broadcast content, using a broadcast decryption key;
    (c) generating at least one local key, said local key including:
        (i) a local encryption key;
        (ii) a local decryption key;
    (d) generating re-encrypted content by re-encrypting said decrypted content using at least one of said local encryption keys;
    (e) associating at least one of said local key sets with said re-encrypted content;
    (f) dispatching said local decryption key to a trusted device;
    (g) dispatching said local re-encrypted content to said trusted device; and
    (h) generating processed content in said trusted device by decrypting said local re-encrypted content using said local decryption key; and
    (i) applying a local watermark to said re-encrypted content.

17. A method for providing local content security including the steps of:
    (a) receiving encrypted broadcast content from a broadcast medium, said encrypted broadcast content encrypted using a broadcast encryption key;
    (b) generating decrypted content by decrypting said encrypted broadcast content, using a broadcast decryption key;
    (c) generating at least one local key, said local key including:
        (i) a local encryption key;
        (ii) a local decryption key;
    (d) generating re-encrypted content by re-encrypting said decrypted content using at least one of said local encryption keys;
    (e) associating at least one of said local key sets with said re-encrypted content;
    (f) dispatching said local decryption key to a trusted device;
    (g) dispatching said local re-encrypted content to said trusted device; and
    (h) generating processed content in said trusted device by decrypting said local re-encrypted content using said local decryption key; and
    (i) applying a watermark to said processed content.

18. A method for providing local content security including the steps of:
    (a) receiving encrypted broadcast content from a broadcast medium, said encrypted broadcast content encrypted using a broadcast encryption key;
    (b) generating decrypted content by decrypting said encrypted broadcast content, using a broadcast decryption key;
    (c) generating at least one local key, said local key including:
        (i) a local encryption key;
        (ii) a local decryption key;
    (d) generating re-encrypted content by re-encrypting said decrypted content using at least one of said local encryption keys;
    (e) associating at least one of said local key sets with said re-encrypted content;
    (f) dispatching said local decryption key to a trusted device;
    (g) dispatching said local re-encrypted content to said trusted device; and
    (h) generating processed content in said trusted device by decrypting said local re-encrypted content using said local decryption key; and
    (i) communicating with a remote application through a back channel.

19. A method according to claim 18, further including the step of receiving at least one feature descriptor.

20. A method according to claim 18, further including the step of associating said broadcast content with said feature descriptor using an identifier.

21. A method according to claim 18, further including the step of associating said local content security system with said feature descriptor using an identifier.

22. A method according to claim 19, wherein at least one of said feature descriptor includes at least one permission rule.

23. A method according to claim 19, wherein at least one of said feature descriptor includes at least one capabilities rule.

24. A method according to claim 19, wherein at least one of said feature descriptor includes at least one content access map.

25. A method according to claim 19, further including the step of enabling and disabling system capabilities according to said feature descriptor.

* * * * *